C. A. BODDIE.
DEMAND METER.
APPLICATION FILED SEPT. 9, 1916.

1,408,255.

Patented Feb. 28, 1922.

WITNESSES:
Fred H. Miller
J. A. Procter

INVENTOR
Clarence A. Boddie
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

DEMAND METER.

1,408,255.  Specification of Letters Patent.  Patented Feb. 28, 1922.

Application filed September 9, 1916. Serial No. 119,235.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Demand Meters, of which the following is a specification.

My invention relates to electrical measuring instruments and particularly to slow-responding meters.

One object of my invention is to provide a meter of the above indicated character that shall indicate a demand equivalent which is substantially the logarithmic-average value of the power traversing the meter.

Another object of my invention is to provide a demand meter that need not be periodically reset and that shall be cheap to construct and accurate in its operation.

A demand meter usually comprises a pointer that is actuated in accordance with the energy to be measured and means for so controlling its operation that it will require a time interval to indicate a value which may be considered the demand equivalent. There has been some uncertainty as to the exact value that the pointer should indicate. That is, whether or not it should follow a definite law and, in this connection, I have found that, if the pointer indicates the logarithmic-average value of the power to be measured, a definite understanding can be arrived at as to the true meaning of the demand indication.

In view of the above, I provide a watthour meter having a pointer that is connected thereto through a planetary-gear system, a constant-speed device and means whereby the constant-speed device tends to oppose the movement of the pointer in such manner that the pointer will indicate the logarithmic-average value of the power traversing the meter. The logarithmic-average indication may be considered the demand equivalent of the energy to be metered and will furnish a definite means for arriving at a basis for rendering a customer a bill on a demand basis.

By "logarithmic average" value I mean such an indication that is always an indication of the integrated energy over a predetermined period of time, since the indication of the energy approaches its true value along a logarithmic curve and according to a law by means of which the actual energy may be shown when the time lag is determined. This terminology is clearly defined and set forth in my U. S. Patent No. 1,156,412.

Figure 1:
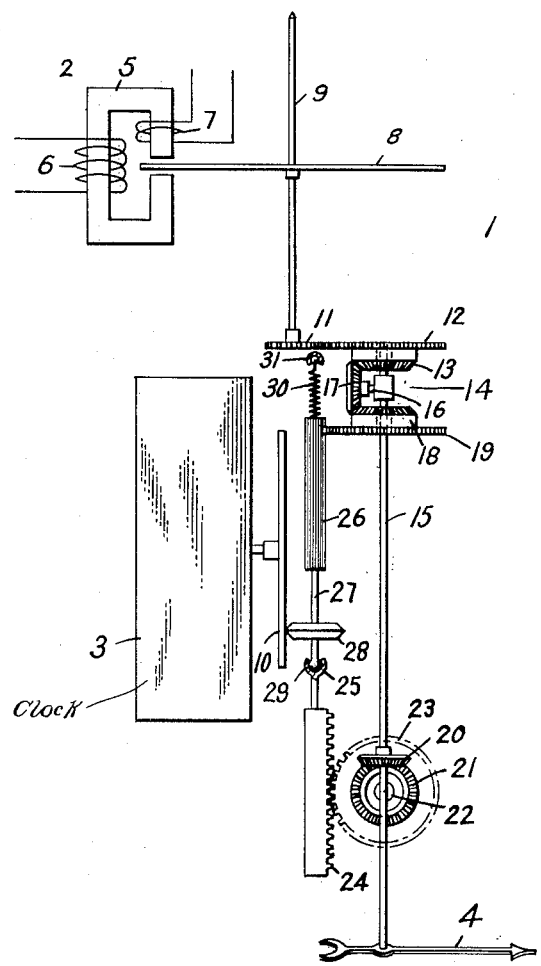
Figure 2:
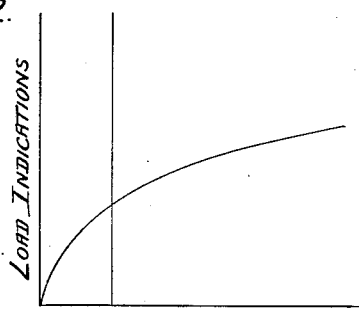

In the accompanying drawings, Fig. 1 is a diagrammatic view of a demand meter embodying my invention, and Fig. 2 is a diagram illustrating the characteristic movement of the pointer of an instrument embodying my invention.

A demand meter 1 comprises a watthour meter 2, a timing device 3, a pointer 4 and gear mechanisms for so connecting the various parts that the pointer indicates the logarithmic-average value of the power traversing the meter 2.

The watthour meter 2 comprises a magnetizable core member 5, voltage and current windings 6 and 7 and an armature 8 that is mounted on a shaft 9. The timing device 3 comprises either a constant-speed motor or a clock that is adapted to actuate a disk 10 at a substantially constant speed. A pinion 11 is mounted on the shaft 9 and is adapted to engage a gear wheel 12 that has secured thereto a bevel gear wheel 13 constituting one of the elements of a planetary-gear system 14. The gear wheels 12 and 13 loosely surround a shaft 15 upon which the pointer 4 is mounted. An arm 16 is mounted on the shaft 15 and carries a bevel gear wheel 17 that is adapted to engage the gear wheel 13 and a second bevel gear wheel 18. The gear wheel 18 is operatively connected to a gear wheel 19 and both of them loosely surround the shaft 15. The gear wheels 13, 17 and 18 constitute the planetary-gear system 14 in which the watthour meter 2 tends to drive in one direction and the timing device 3 tends to drive in the other direction.

A gear wheel 20 is mounted on the shaft 15 and is adapted to engage a gear wheel 21 that is mounted on a shaft 22 upon which a gear wheel 23 is also mounted. The gear wheel 23 is adapted to engage a rack 24 that is provided with a socket 25. A clock-actuated member in the form of a relatively long pinion 26 is mounted on a shaft 27 upon which is also mounted a friction wheel 28 that is adapted to engage the disk 10 of the timing device or clock mechanism 3 for the purpose of actuating the pinion 26. The shaft 27 is provided with a rounded end 29 that is adapted to be seated in the socket 25 and is supported by a spring 30 that is, in turn, connected to a stationary member through a ball-and-socket connection 31. The pinion 26 is adapted to engage the gear wheel 19 and thus tends to turn the gear wheel 17 and, consequently, the pointer 4 in the direction opposite to that in which the measuring instrument 2 tends to turn it.

When no power traverses the measuring instrument 2, the spring 30 is adapted to hold the friction wheel 28 in a position adjacent the center of the disk 10. However, when power traverses the instrument 2, the armature 8 will turn in accordance with the energy to be measured, and, through the pinion 11 and gear wheels 12, 13 and 17 will actuate the pointer 4. But, when the shaft 15 turns, the rack 24 will be moved downwardly an amount proportional to the movement of the shaft 15, and the friction wheel 28 will be moved to an off-center position with respect to the disk 10. Thus, the friction wheel 28 and the pinion 26 will be rotated at a speed proportional to the distance moved by the friction wheel 28 from its normal position, and, since this is proportional to the speed of the shaft 15, the gear wheels 18 and 19 are actuated at a speed proportional to the speed of the gear wheels 12 and 13 but in the opposite directions. When the speeds of the gear wheels 13 and 18 are equal, the gear wheel 17 will rotate but will not revolve and, consequently, will not actuate the pointer 4.

From the foregoing, it will be understood that the pointer 4 will advance along a logarithmic curve because its retardation is proportional to the distance moved. That is, the pointer 4 will continue to move along a logarithmic curve until the speed of the gear wheels 18 and 19 has increased to that of the gear wheels 12 and 13. When this occurs, the pointer 4 will indicate the value of the power traversing the watthour meter 2.

I do not limit my invention to the particular structure illustrated, as it may be variously modified within the scope of the appended claims.

I claim as my invention:

1. In a demand meter, the combination with an electro-responsive device and a constant-speed device, of a pointer operatively connected to the electro-responsive device, and means interposed between the electro-responsive device and the constant-speed device whereby the electro-responsive device and the timing mechanism co-operate to cause the pointer to indicate the logarithmic-average value of the power traversing the electro-responsive device.

2. In a measuring instrument, the combination with a watthour meter and a constant-speed device, of a pointer actuated by the watthour meter, means controlled by the movement of the pointer and actuated by the constant-speed device for so controlling the movement of the pointer as to cause it to indicate the demand equivalent of the power traversing the watthour meter.

3. In a measuring instrument, the combination with a watthour meter and a pointer, of timing means operatively connected to the pointer for so cooperating with the watthour meter as to cause the pointer to require a time that varies in accordance with the logarithmic-average value of the power traversing the meter to reach its final indication.

4. The combination with a watthour meter, a pointer and a movable member, of a planetary gear mechanism operatively connected to the pointer, means whereby the watthour meter actuates one member of the gear mechanism, means whereby the movable member actuates the other member of the gear mechanism, and means actuated by the pointer for controlling the speed of the movable member.

5. In a measuring instrument, the combination with a watthour meter and a pointer actuated by the meter, of means operatively connected to the pointer for so controlling the movements of the pointer that it is adapted to indicate the logarithmic-average value of the power traversing the watthour meter.

6. In a measuring instrument, the combination with an electro-responsive device and a pointer operatively connected thereto, of a clock-actuated device controlled by the pointer and adapted to co-operate with the electro-responsive device to cause the pointer to indicate the logarthmic average value of the power traversing the electro-responsive device.

7. In a measuring instrument, the combination with a watthour meter, a clock-actuated member and a pointer, of a planetary-gear system for connecting the pointer to the meter and the clock-actuated member, and means actuated by the pointer for controlling the clock-actuated member.

8. In a slow-responding measuring instrument, the combination with an electro-responsive device and a pointer, of a planetary-gear system for operatively connecting the pointer to the electro-responsive device, a movable member for so controlling the planetary-gear system as to control the time lag in the movement of the pointer, and means actuated by the pointer for controlling the operation of the movable member.

9. In a measuring instrument, the combination with a watthour meter, a clock-actuated member and a pointer, of means for so connecting the pointer to the meter and to the clock-actuated member and for so controlling the operation of the member that the pointer requires a time that varies in accordance with the logarthmic-average value of the power traversing the meter to reach its final indication.

10. In a measuring instrument, the combination with a meter element and a pointer actuated thereby, of a constant-speed device and a variable-speed device operatively connected between the constant-speed device and the pointer for controlling the time required for the pointer to indicate.

In testimony whereof, I have hereunto subscribed my name this 26th day of August, 1916.

CLARENCE A. BODDIE.